United States Patent [19]

Hagen et al.

[11] 4,408,454
[45] Oct. 11, 1983

[54] FLUID COUPLED WAVE GENERATOR ARRAY WITH SUBSEA STRUCTURE

[75] Inventors: Glenn E. Hagen; Carroll K. Gordon, both of New Orleans, La.

[73] Assignee: Sea Energy Corporation, New Orleans, La.

[21] Appl. No.: 169,510

[22] Filed: Jul. 21, 1980

[51] Int. Cl.³ ............................................. F03B 13/12
[52] U.S. Cl. ...................................... 60/500; 60/506; 60/497; 417/331
[58] Field of Search ................................. 60/497–507; 290/53, 54; 417/330–334

[56] References Cited

U.S. PATENT DOCUMENTS

| | | | |
|---|---|---|---|
| 855,258 | 5/1907 | Neal | 417/332 |
| 4,077,213 | 3/1978 | Hagen | 60/500 |
| 4,208,875 | 6/1980 | Tsubota | 60/499 |
| 4,241,579 | 12/1980 | Borgren | 60/504 |

*Primary Examiner*—Allen M. Ostrager

[57] ABSTRACT

The preferred embodiment of the invention is a wave powered generator including a "Hagen" float array comprising a plurality of floats each of which is coupled to a subsea support structure through a nonlinear power extraction means. The array may be moved below the surface to avoid adverse sea states. Individual array elements are sized and positioned on the support structure to permit fluid coupling of reflected wave energy between the floats.

5 Claims, 4 Drawing Figures

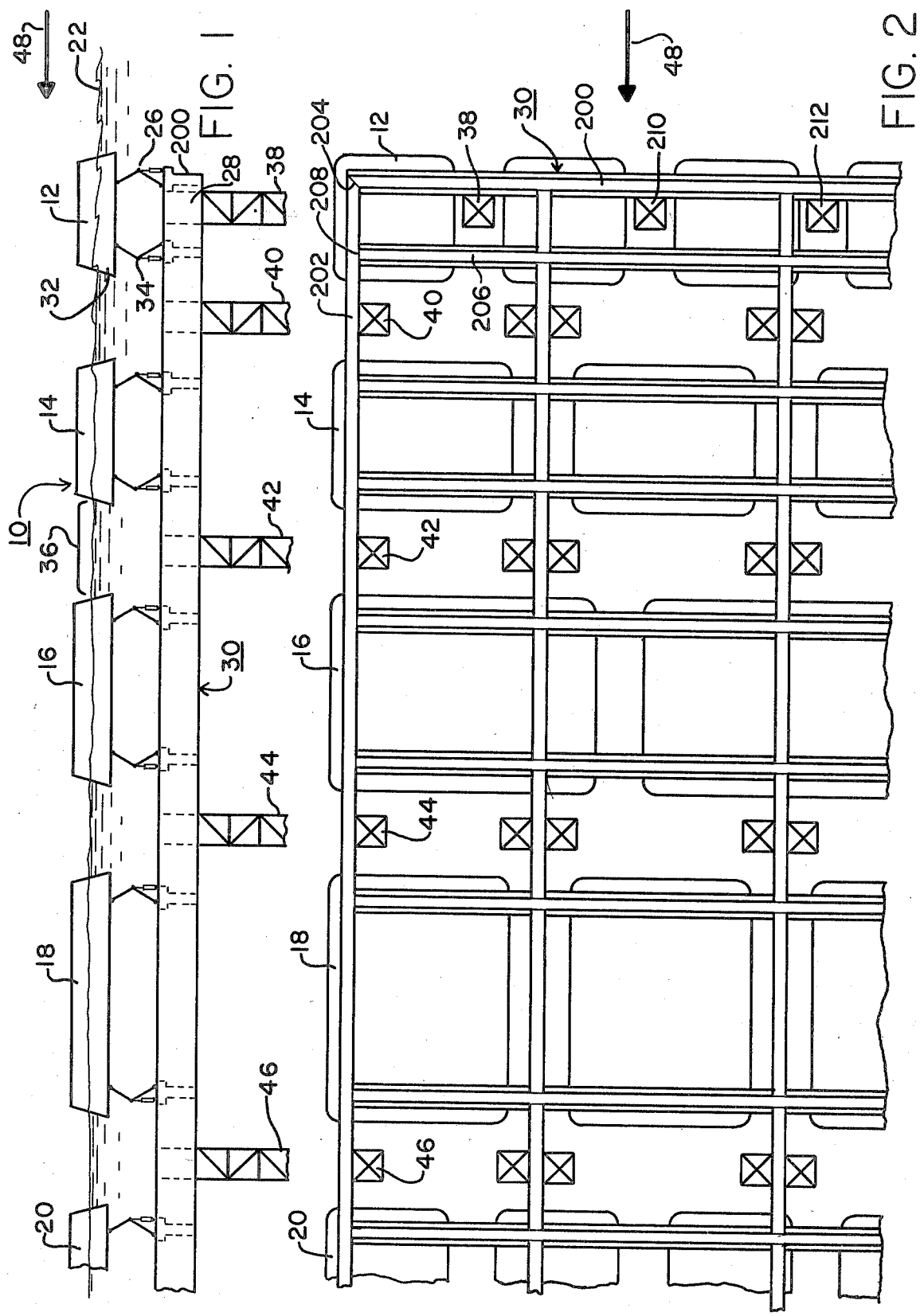

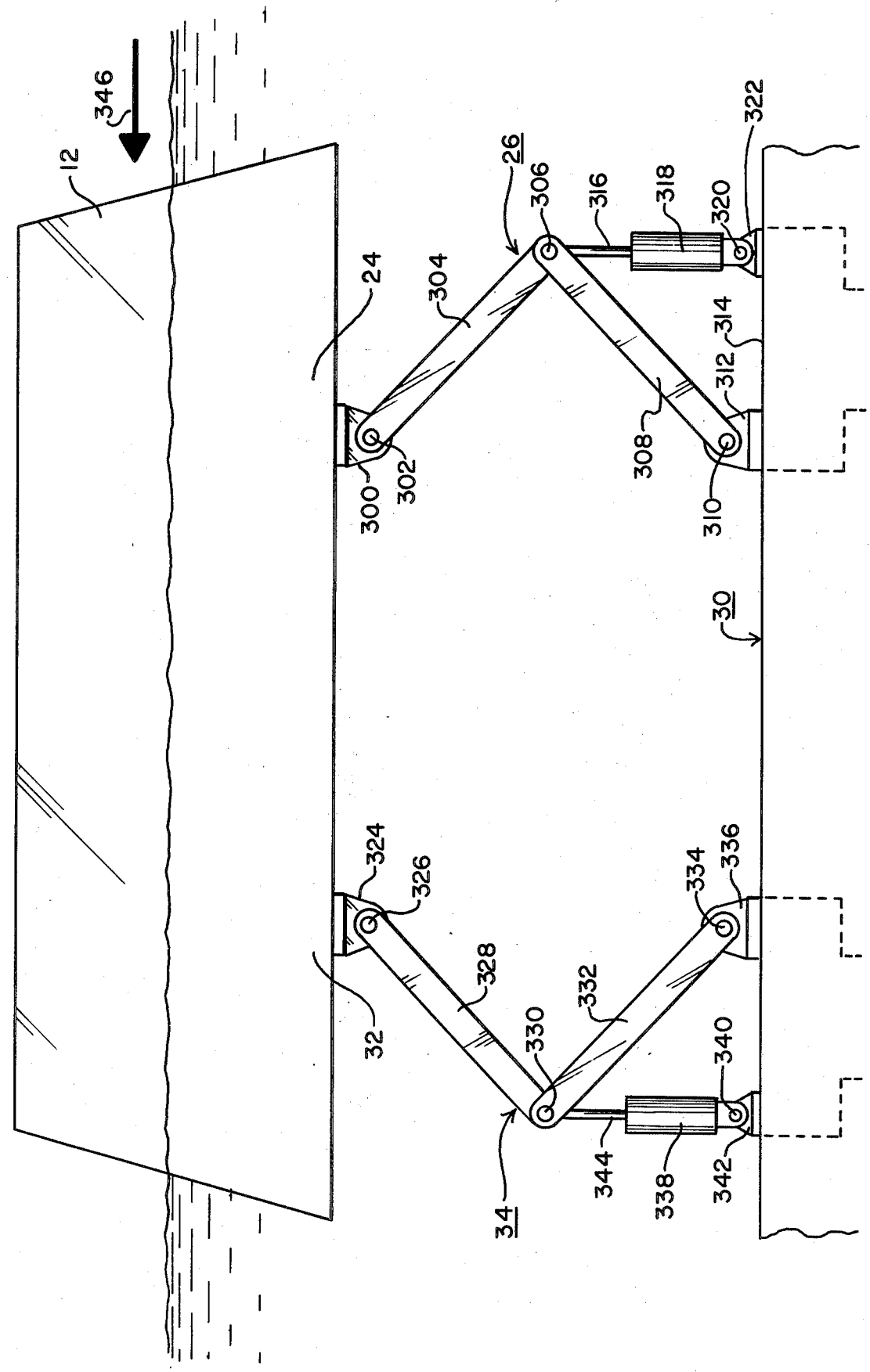

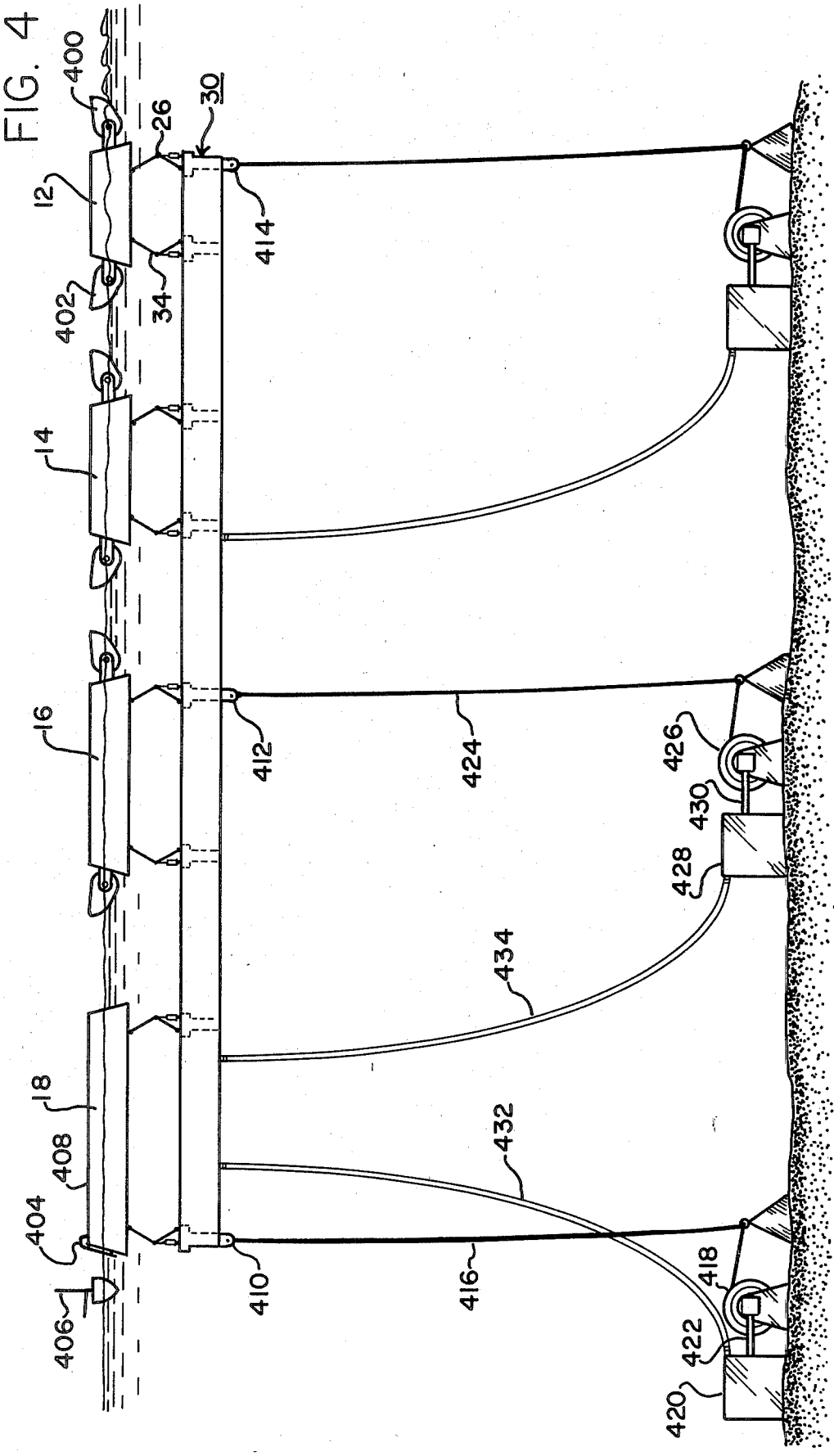

FLUID COUPLED WAVE GENERATOR ARRAY WITH SUBSEA STRUCTURE

TECHNICAL FIELD

The invention relates to float arrays that power wave generators. More specifically the present invention relates to an improved method of anchoring and controlling a broadband multi-float wave energy absorber.

BACKGROUND ART

U.S. Pat. No. 4,077,213 issued to applicant in 1978. In that patent, applicant discloses a wave driven generator wherein a plurality of different sized floats were connected into an array through nonlinear interfaces so their relative motion drives hydraulic pumping means to generate electricity. In that application, which is herein incorporated by reference, the individual floats of the wave driven generator power absorbing array were sized so as to present a "black body" or "Hagen Array" to ocean waves incident upon them.

When wave energy impinges upon a floating object, the energy is split three ways. A first portion is absorbed by the object if the object's motion is resisted, as it would be in wave generator functionally adapted to drive a prime mover. Any single float will probably not absorb more than about one-third of the energy incident upon it. A similar amount is reflected. The amount of energy reflected from a given float depends on the physical characteristics of the float such as its mass, size and shape and the amount of resistance or "back pressure" the incident wave experiences when it moves the float. Yet another increment of wave energy is transmitted through whatever structure the float is attached.

One of the objects of U.S. Pat. No. 4,077,213 was to provide a wave generating system wherein the float array absorbed virtually all of the energy impinging on it over a broad bandwidth of ocean waves. Applicant Hagen's co-pending application filed simultaneously with this application, discusses a wave generating array capable of absorbing more energy than impinges upon the array directly.

On Apr. 23, 1979 applicant filed for reissue of U.S. Pat. No. 4,077,213. This reissue application, Ser. No. 032,162, has issued on Dec. 28, 1982 as U.S. Pat. No. Re 31,111.

Part of applicant's development program for commercializing his earlier invention was to estimate the construction costs for a 1 MW and 3 MW pilot plant constructed according to the teachings of U.S. Pat. No. 4,077,213. It quickly developed that one of the most important cost drivers affecting system design was the mooring system adopted for use with the invention. All conventional large float array mooring systems, such as the one disclosed in U.S. Pat. No. 4,013,382 rely on a complex network of overhead frame sections. This type of mooring is extremely expensive, costing between $500 and $1,000 per kilowatt of installed generating capacity for the Hagen array, i.e. the invention disclosed in U.S. Pat. No. 4,077,213.

Aside from being relatively expensive, the preferred embodiment shown in the earlier patent would be difficult to service if a plurality of generator modules were installed at the same location. This would be true because a float in the middle of the array might need servicing and it would be quite difficult to get a ship or crew to the float to do the servicing. It would be desirable to allow boats to pass between the floats in order to do routine servicing on the float array.

Array support structures projecting above the surface of the water also suffer from vulnerability to adverse weather, i.e. hurricanes and the like. Finally, from a purely aesthetic standpoint, they are profoundly ugly.

Over the past decade great progress has been made by the petroleum industry in the fabrication, construction, implacement and operation of large subsea structures. The largest use of these structures has been for oil rigs operating in relatively shallow water. Recently some subsea structures have been implaced in as much as 500 feet of water. Current anti-corrosion coatings and cathodic protection systems are sufficiently advanced to insure a sufficiently long life to make an underwater support system commercially feasible. This underwater system would also be physically attractive, environmentally beneficial, and would allow access to any part of the array for maintenance.

As model tank tests and small scale sea tests of the Hagen array were conducted during applicant's development program, data accumulated to the effect that the wave energy reflected from larger floats in the array was quite significant. The present invention is one way of providing a large number of intermediate and small size floats in the Hagen array whereby this reflected wave energy may be efficiently captured even in relatively low sea states.

It is therefore an object of the present invention to provide an array wherein reflected power is fluid coupled between a plurality of varying sized floats without direct physical connections between the floats.

Another object of the present invention is to provide a Hagen array that is accessible to maintenance ships.

A further purpose of the present invention is to provide a Hagen array that is physically attractive and can be used by pleasure boaters for fishing and the like.

Yet another purpose of the present invention is to provide a Hagen array wherein the individual floats of the array are coupled directly to a substructure that forms an artificial reef, which will attract fish and the like.

A final purpose of the present invention is to provide an alternative means of generating very large amounts of baseload electric power that a positive environmental impact.

BRIEF DESCRIPTION OF THE DRAWINGS

FIG. 1 is a schematic profile view of a Hagen array constructed according to the preferred embodiment of the present invention;

FIG. 2 is a plan view from the bottom of a Hagen array constructed according to the preferred embodiment of the present invention; and FIG. 3 is a detailed view of a single float attached to a substructure as part of the Hagen array taught by the preferred embodiment of the present invention.

FIG. 4 is a profile view of another embodiment of the present invention.

DISCLOSURE OF THE INVENTION

The present invention is a fluid coupled Hagen array using a subsurface support structure whereby the array may be serviced easily and become environmentally beneficial. Individual floats in the Hagen array coupled to the support structure through a nonlinear power extraction means. The individual floats in the Hagen array are sized and positioned on the support structure to permit fluid coupling to occur of the wave energy reflected between them.

FIG. 1 shows a Hagen array 10 comprising floats 12, 14, 16, 18 and 20. These floats float approximately half submerged under the surface 22 of the ocean. Float 12 is connected at its forward end by nonlinear power extraction means 26 to the forward end 28 of frame structure 30 which is a subsea platform well known to those skilled in the art of building offshore structures.

Float 12 is attached at its rear end 32 to a second nonlinear power extraction means 34. These nonlinear power extraction means are discussed in more detail in connection with FIG. 3, below.

Floats 14, 16, 18 and 20 are similarly coupled at their forward and aft ends by nonlinear power extraction means to subsea structure 30.

The space between the floats, e.g., space 36 between floats 16 and 14, are made large enough to permit the passage of fishing boats, pleasure ships and the maintenance work ships required to keep the Hagen array maintained in good operating condition.

Subsea platform 30 is shown connected to the ocean floor by a plurality of jack-up legs 38, 40, 42, 44 and 46. Jack-up rigs of this type are well known to those skilled in the art of offshore construction.

Hagen array 10 is so designed that its normal operation permits subsea base 30 to be jacked completely to the top of jack-up legs 38, 40, 42, 44 and 46.

If sea states occur that are beyond the design limits of Hagen array 10, i.e. a hurricane or the like, then sea cocks, not shown, in floats 12, 14, 16, 18 and 20 are opened and subsea platform 30 is jacked down on legs 38, 40, 42, 44 and 46 until the top of the floats of the Hagen array are sufficiently below the surface 22 of the ocean that the entire generating system will not be overstressed mechanically. At sea states near the design limits of the Hagen array 10, floats 12, 14, 16, 18 and 20 may be partially flooded and subsea structure 30 jacked partially down its jack-up legs to increase the upper end of the dynamic range to which Hagen array 10 may be tuned.

Functionally, incident waves from a direction shown by arrow 48 impinge upon the first Hagen array float 12. As was described in U.S. Pat. No. 4,077,213, a portion of this wave energy is absorbed, a portion transmitted and a portion reflected. After the wave energy passes the first element of the Hagen array and strikes element 14, any wave energy reflected from 14 back to 12 will be trapped in the array. This was described in detail in the above referenced patent and is a fundamental characteristic of the Hagen array.

It is important to note that the position of various sized elements of the Hagen array are strictly a matter of design choice in the present invention. For a particular sea state and location, it may be desirable to, for example, place a series of intermediate sized Hagen array absorber elements between floats 16 and 18 to preferentially absorb a particular component of the wave frequency spectrum of the incident waves reflected between float 16 and 18.

The design criteria by which array configurations would be selected for optimum performance has not yet been fully investigated and is at present unknown to applicant. Applicant believes, however, that the array configuration shown in FIG. 2, which corresponds closely to the array configuration taught by U.S. Pat. No. 4,077,213, is the best configuration for most sea states and locations.

It should further be noted that the individual array elements of the Hagen array taught by the preferred embodiment of the present invention may be of any shape or size. Specifically, Hagen array elements need not be thin, flat, trapizoidal forms as is shown in FIGS. 1 and 2. It is contemplated that it may be beneficial to the efficiency of the Hagen array if the first element of the array, perhaps even forward of leading float 12, were to be a Salter Duck as is described in U.S. Pat. No. 3,928,967. The Salter Duck is a effective way of removing wave energy from ocean waves. It suffers, however, from the defect that it is hard to moor.

FIG. 2 shows a plan view of a Hagen array illustrated in FIG. 1 above. FIG. 2 is shown looking from below up at the array floating on the surface of the water. In FIG. 2, like numbers illustrate like parts.

Subsea structure 30 has a forward beam member 200 that runs essentially parallel and congruent with the front surface 24 of Hagen array element 12. A righthand longitudinal element 202 is attached to the lefthand side of beam element 200 at junction 204. Rear first element beam structure 206 is attached by bolting, welding, or any other convenient means to longitudinal member 202 at joint 208. Jack-up legs 38, 210 and 212 are shown functionally engaging front beam 200 of subsea jack-up structure 30. Jack-up legs 40, 42, 44 and 46 functionally engage longitudinal element 202. FIG. 2 schematically shows the other transverse beam and longitudinal elements that make up subsea structure 30 together with the jack-up rig legs that engage the structure so as to raise and lower it. Since these structures are well known to the art of marine engineering, applicant will not go into a extremely detailed structural recitation of how the parts are connected together. Applicant believes that a quick glance at FIG. 2 would show anyone with skill in the art of designing offshore structures general elements from which he could design such a structure.

For a full-scale Hagen array wave generating system it would seem likely that concrete would be a most suitable construction material. Of course it would be reinforced with steel. The use of concrete would lend itself both to production line techniques that would be required in large ship building programs and would also insure that the system had a relatively long maintenance free life. It is probably desirable to build some of the jack-up rig of steel to facilitate ease of construction and fitting of the mechanical interfaces that allow the system to be jacked up and down in the water. Of course, steel construction does lead to problems, notably corrosion. Current coatings and cathodic protection systems, however, are adequate to insure a sufficiently long life, usually 40 years, to make a power plant built using Hagen arrays economically feasible.

FIG. 3 shows a detailed view of the nonlinear power extraction means 26 and 34 coupling float 12 to subsea structure 30.

Float 30 is equipped at its front lower end 24 with a hinge connector 300. Hinge pin 302 connects upper lever arm 304 through hinge pin 306 to lower level arm 308. Lower level arm 308 is attached at its lower end through hinge pin 310 to lower bearing block assembly 312. Bearing assembly 312 is affixed by welding, bolting, or any other convenient means to the upper surface 314 of subsea structure 30. An actuator arm 316 of hydraulic cylinder 318 is connected at its upper end to pivot joint 306. Hydraulic cylinder 318 is mounted at its lower end by a turnbuckle connector 320 to turnbuckle 322 on the upper surface 314 of subsea structure 30.

Similarly, the rear 32 of float 12 is equipped with a turnbuckle 324 on its lower surface. Turnbuckle 324 is connected by bearing 326 to rear upper hydraulic actuator arm 328. The lower part of arm 328 is equipped with a pivot joint 330. Pivot joint 330 engages the upper end of lower hydraulic connecting arm 332 which, in turn is connected at its lower turnbuckle connecting end 334 to turnbuckle 336. Turnbuckle 336 is affixed by welding, bolting, or any other convenient means to the upper surface 314 of subsea structure 30.

Hydraulic cylinder 338 is connected at its lower turnbuckle connector end 340 to turnbuckle 342. Turnbuckle 342 is connected by welding, bolting, or any other convenient means to the upper surface 314 of subsea structure 30. The upper end of actuator arm 344 of double-acting hydraulic cylinder 338 is connected to bearing joint 330. Although only two nonlinear fluid power extracting means are shown in FIG. 3, it should be understood that a plurality of these means may be located between the bottom surface of any element of the Hagen array and the upper surface of subsea structure 30. It is contemplated that many of these devices will be used to extract energy from the larger array elements such as elements 18 and 20 is FIG. 1 and 2.

Functionally, incident waves from a direction indicated by arrow 346 strike Hagen array element 12 and cause to move. As the float moves, the nonlinear power extraction means cause hydraulic cylinders 318 and 338, which are double-action acting hydraulic cylinders, to pump fluid as was described in U.S. Pat. No. 4,077,213. The fluid pumped by these cylinders may be hydraulic fluid, or may be sea water, which would simplify the plumbing arrangements considerably.

Since each float in the Hagen array is attached by a plurality of nonlinear power extraction means to subsea structure 30, the entire power extraction and anchoring means for the array elements is both failsafe and inherently reliable. If any one power extraction mean fails, it only lessens the power output of the array by a very small amount. If a power extraction means fails completely, the array element is still anchored by other power extractors sufficiently to be safe.

Although jack-up rigs such as those shown in FIGS. 1 and 2 are extremely rugged and reliable, they are somewhat expensive to build past a relatively shallow depth, i.e. a few hundred feet. Further, a certain amount of the energy impinging on the Hagen array 10 does nothing but push the jack-up rig into the ground or pull it out of the ground, thus the system is not as efficient as could be desired.

FIG. 4 illustrates an embodiment of the present invention wherein the subsea structure 30 free floats. Neutral bouyancy may be achieved in the subsea structure 30 by any convenient means, many of which are well known to designers of offshore structures.

In FIG. 4 Hagen array elements 12, 14 and 16 are shown equipped on their leading and trailing edges with Salter Duck wave energy extraction mechanisms. These mechanisms are described in detail in U.S. Pat. No. 3,928,967.

Specifically, Salter Duck 400 is shown on the leading edge of Hagen array element 12 and Salter duck 402 is shown on the trailing edge.

Functionally, waves incident upon the Hagen array first strike Salter Duck 400 which removes some of the wave's energy, particularly in the high frequency region of the wave energy spectrum. The Hagen array then operates as described in U.S. Pat. No. 4,077,213 to set up a field of reflected waves between the network of Hagen array elements that comprise the entire array. Salter Duck 402, which is mounted on the trailing edge of Hagen array element 12, intercepts and absorbs some of these reflected waves.

In FIG. 4 only rear element 18 is not equipped with Salter Ducks. Instead, rear element 18 is shown with a ladder 404 affixed to its trailing edge. During any normal sea state, tourists would be able to dock their boat 406 with Hagen array element 18 and spend the day fishing on the top surface 408 of array element 18.

It is an established fact that artificial reefs make very good fishing grounds. This fact has been known for decades by crews on offshore structures. Applicant believes that the present invention will have a beneficial impact on the marine environment where it is locked.

In another embodiment, the perimeter of the Hagen array elements could be lined with Salter Ducks.

Since subsea structure 30 in FIG. 4 is free floating, it must be anchored, in some manner, to the bottom of the ocean.

The bottom of subsea structure 30 is equipped with turnbuckles 410, 412 and 414. It should be understood that these are only three of a plurality of turnbuckles spaced as is structurally desirable on the bottom of structure 30.

Turnbuckle 410 is connected via anchor line 416 to subsea winch 418. Subsea winch 418 drives subsea hydraulic motor pump 420 through shaft 422.

Similarly, turnbuckle 412 is connected via line 424 to subsea winch 426. Subsea winch 426 drives subsea hydraulic motor pump 428 via shaft 430. Hydraulic line 432 connectes subsea hydraulic motor pump 420 to the hydraulic distribution network and controls units, not shown, on subsea structure 30. Likewise, hydraulic supply lines 434 connect hydraulic motor pump 428 to the supply lines and controls, not shown, on structure 30. All the other anchoring means attaching subsea structure 30 to the sea floor are similarly configured.

Functionally, the anchor lines and winches depicted in FIG. 4 allow the entire Hagen array to be dynamically positioned. Further, in bad weather that produced sea states beyond the operating limits of the Hagen array, the Hagen array floats can be flooded to a state of slightly positive bouyancy and winches 418 and 426, et al., can pull the entire float system attached to subsea structure 30 far enough beneath the surface to protect the system from the undue weather induced stresses.

An additional advantage gained by the embodiment of the present invention shown in FIG. 4 is the fact that as the entire subsea structure 30 is moved by long wavelength swells, the hydraulic winches connecting it to the sea floor can drive their associated hydraulic motors to force hydraulic fluid into the distribution system onboard the subsea structure 30. This allows the present invention, as shown in FIG. 4, to recover energy that would otherwise be lost from long wavelength swells.

Hydraulic power generated by the hydraulic motors associated with the subsea winches, as well as hydraulic power generated by the Salter Ducks and the nonlinear power extraction means associated with the elements of the Hagen array may be used to generate electricity onboard the wave array, i.e. by driving a Pelton Wheel connected to an alternator. Alternatively, hydraulic power can be piped to shore and used to drive a generator on shore. Similarly, electric power generated on the Hagen array system may be used to manufacture valuable chemicals from the ocean or may be carried ashore by conductors let along the sea floor.

Although the specification has illustrated several detailed embodiments of the present invention, these embodiments should not be taken as limiting the scope of the invention. They are furnished merely to comply with the statutory requirement that the inventor disclose the best mode he knows of making and using his invention. The present invention should be limited only by the appended claims and their equivalents.

We claim:

1. A wave power extraction system for operation on the ocean comprising:
    a plurality of floats, each said float being sized and positioned to form a Hagen array when they are on the ocean's surface, said Hagen array being an arrangement of differing sized floats adapted to allow relative motion between adjacent floats so as to be responsive to both the amplitude spectrum and the wavelength spectrum of wave motion;
    subsea structure means for supporting said Hagen array;
    power extraction means connected to said floats in said Hagen array and to said subsea structure and responsive to the relative motion therebetween; and
    anchoring means connected to said structure and to the sea floor for connecting said structure to the sea floor, said anchoring means includes an anchoring cable connected to said structure, and said anchoring means includes a subsea winch driven by a prime mover, said winch being capable of controllably reeling and unreeling said anchoring cable.

2. A system as in claim 1 wherein said winch comprises,
    control means responsive to the motion of said structure for maintaining a preset tension on said cable, and
    a prime mover means responsive to said control means for feeding said cable on and off a winch-drum to maintain said tension.

3. A system as in claim 2 wherein said prime mover means comprises a hydraulic motor-pump, whereby the motion of said structure pumps fluid to extract useful energy from said motion.

4. A system as in claims 1, 2 or 3 wherein at least one float in said Hagen array is provided with at least one Salter Duck operably affixed to said float, said Salter Duck comprising a horizontal shaft supported by said float, a second member pivotally supported on said horizontal shaft and having a vertical cross-sectional contour of asymmetrical shape with a rear circular portion having a radius centered at the center of said horizontal shaft and a forward generally pointed portion extending from said rear circular portion.

5. A system as in claims 1, 2, or 3 wherein said power extraction means is at least one hydraulic piston adapted to pump fluid when relative motion occurs between said float and said structure.

* * * * *